(12) United States Patent
Walker

(10) Patent No.: US 12,619,030 B2
(45) Date of Patent: May 5, 2026

(54) OPTICAL STRUCTURE

(71) Applicant: Axenic Limited, Sedgefield (GB)

(72) Inventor: Rob Walker, Crook (GB)

(73) Assignee: Axenic Limited, Durham (GB)

( * ) Notice: Subject to any disclaimer, the term of this patent is extended or adjusted under 35 U.S.C. 154(b) by 210 days.

(21) Appl. No.: 18/324,008

(22) Filed: May 25, 2023

(65) Prior Publication Data

US 2023/0384524 A1    Nov. 30, 2023

(30) Foreign Application Priority Data

May 26, 2022    (GB) ...................................... 2207785

(51) Int. Cl.
G02B 6/293          (2006.01)
(52) U.S. Cl.
CPC ................................. G02B 6/29344 (2013.01)
(58) Field of Classification Search
CPC ................................................. G02B 6/29344
USPC ............................................................ 385/24
See application file for complete search history.

(56) References Cited

U.S. PATENT DOCUMENTS

| | | | |
|---|---|---|---|
| 8,532,447 B1 * | 9/2013 | Kwakernaak ........ | G02B 6/2813 |
| | | | 385/31 |
| 2003/0026544 A1 * | 2/2003 | Lin .................... | G02B 6/12028 |
| | | | 385/24 |
| 2005/0123234 A1 * | 6/2005 | Kanie ................. | G02B 6/12007 |
| | | | 385/18 |

(Continued)

FOREIGN PATENT DOCUMENTS

| | | |
|---|---|---|
| EP | 3460544 A1 | 3/2019 |
| JP | 2006323135 A | 11/2006 |

OTHER PUBLICATIONS

The extended European Search report for European application No. EP23174302 dated Oct. 25, 2023.

(Continued)

*Primary Examiner* — Jerry M Blevins
(74) *Attorney, Agent, or Firm* — Quinn IP Law

(57)          ABSTRACT

An optical structure comprising
  a multimode interference waveguide section, the multimode interference waveguide section comprising an input face, an output face and sidewalls extending therebetween, the sidewalls extending substantially parallel to a length axis;
  at least one input optical waveguide abutting the input face and spaced apart from the sidewalls;
  at least one output optical waveguide abutting the output face and spaced apart from the sidewalls;
  the input face being divided into first and second input face shoulder portions arranged on opposite sides of the at least one input optical waveguide; and
  the output face being divided into first and second output face shoulder portions arranged on opposite sides of the at least one output optical waveguide;
  the optical structure further comprising at least one external reflector appendage, the at least one external reflector appendage comprising a reflector portion integrally extending from a shoulder portion and an appendage waveguide integrally extending from the reflector portion along an axis inclined to the length axis, the reflector portion comprising a reflector wall arranged such that light travelling parallel to the length axis which is incident on the reflector wall is reflected into the appendage waveguide.

12 Claims, 6 Drawing Sheets

(56) References Cited

U.S. PATENT DOCUMENTS

| 2016/0011370 A1* | 1/2016 | Okayama ............. G02B 6/1228 |
| | | 385/14 |
| 2020/0264369 A1* | 8/2020 | Takabayashi ............. H01S 5/40 |
| 2021/0080653 A1* | 3/2021 | Walker ................. G02B 6/2813 |
| 2022/0050350 A1 | 2/2022 | Takabayashi et al. |

OTHER PUBLICATIONS

UKIPO Search report for GB Application No. GB2207785.3, dated Nov. 29, 2022.

* cited by examiner

OPTICAL STRUCTURE

CROSS-REFERENCE TO RELATED APPLICATION

This application claims priority to and the benefit of Great Britain Patent Application GB2207785.3 filed 26 May 2022, which is hereby incorporated by reference in its entirety.

TECHNICAL FIELD

The present invention relates to an optical structure.

SUMMARY

The present invention relates to an optical structure. More particularly, but not exclusively, the present invention relates to an optical structure comprising a multimode interference waveguide section comprising an input face and an output face, each of which is divided into first and second shoulder portions, the optical structure further comprising at least one external reflector appendage which comprises a reflector portion integrally extending from a shoulder portion and an appendage waveguide integrally extending from the reflector portion, the reflector portion comprising a reflector wall arranged such that light travelling parallel to the length axis which is incident on the reflector wall is reflected into the appendage waveguide.

Functionally, a multi-mode interference waveguide (MMI) section is a section of optical waveguide which is made significantly wider than normal in order to support a relatively large number of modes. The term 'modes' refers to spatial harmonics of a fundamental waveguide mode, relating to the lateral or 'width' dimension. The fundamental mode has a single light-intensity maximum at or near the centre of the lateral profile while modes of higher order exhibit multiple intensity maxima and minima; the mode-order number is, by convention, the same as the number of minima. Modes can be divides into two classes:

Even order modes (orders 0, 2, 4 etc.) which have an intensity peak at or near the waveguide centre. The all-important fundamental mode (Order-0) is one such. These modes are symmetric in both phase and amplitude.

Odd-order modes (orders 1, 3, 5 etc.) which have an intensity-null at or near the waveguide centre, which is also an optical-field zero-crossing. Though also symmetric in amplitude, odd modes are antisymmetric in phase.

Due to this symmetry/anti-symmetry dichotomy, a symmetrically disposed input waveguide mode to an MMI section will generally excite only one type or the other, leading to different re-imaging properties for even and odd mode input.

For most purposes, a general waveguide will ideally support only one mode (the fundamental); however, achieving this ideal involves design compromises which may not be acceptable. Here it will be assumed that all waveguides support at least two modes. The harmonic relationship between the form and propagation-velocities of the MMI modes results in useful properties of re-imaging, whereby an input optical profile can be re-created in single or multiple form at the output end-face provided the length of the MMI section is correct. MMI sections are useful for optical splitting and recombination functions. They are also useful for mode filtering as even-order and odd-order modes have different re-imaging lengths.

Multimode interference waveguide sections (MMI sections) are well known in the art. Basic MMI sections are rectangular in plan comprising input and output faces with sidewalls extending therebetween, all at least partially reflective to a light wave except where abutted to a waveguide. At least one input optical waveguide is abutted to the input face. At least one output optical waveguide is abutted to the output face. The input and output waveguides are narrower than the MMI section but are otherwise similarly constructed. If approximately centrally aligned to the MMI section, they give rise to shoulder portions at each end face i.e. between the external corner where the end face meets the side walls and the point where the input or output waveguide abuts the end face.

Ideally the MMI section is so dimensioned that a fundamental waveguide mode provided to the multimode interference section by the input optical waveguide(s) is identically imaged at the output optical waveguide(s). The provided signal typically comprises multiple modes. It is known that whilst some of these modes (fundamental and even order) will be reimaged at the output waveguides, the others (odd orders) will be displaced and reimaged at the shoulders of the multimode interference section.

The shoulder portions retro-reflect at least some of this light back towards the input face where, by reciprocity, it is reimaged back to the launch profile on the input waveguide(s) and may ultimately degrade the optical return loss from the main input port. It may additionally undergo further reflections from other multimode interference sections or imperfectly anti reflection coated facets to create intra-circuit resonances.

U.S. Pat. No. 8,649,641B2 discloses a multimode interference section in which a shoulder portion of the end face is cut at an angle so that incident light is reflected out of a port in the side wall into a curved waveguide. This chamfer at one side and waveguide port at the other changes the geometry of the MMI section near the critical end face by displacing one wall and removing the other entirely for a short distance. This reduces performance.

The present invention seeks to overcome the problems of the prior art.

Accordingly, the present invention provides an optical structure comprising:

a. a multimode interference waveguide section, the multimode interference waveguide section comprising an input face, an output face and sidewalls extending therebetween, the sidewalls extending substantially parallel to a length axis;

b. at least one input optical waveguide abutting the input face and spaced apart from the sidewalls;

c. at least one output optical waveguide abutting the output face and spaced apart from the sidewalls;

d. the input face being divided into first and second input face shoulder portions arranged on opposite sides of the at least one input optical waveguide; and e. the output face being divided into first and second output face shoulder portions arranged on opposite sides of the at least one output optical waveguide;

f. the optical structure further comprising at least one external reflector appendage, the at least one external reflector appendage comprising a reflector portion integrally extending from a shoulder portion and an appendage waveguide integrally extending from the reflector portion along an axis inclined to the length axis, the reflector portion comprising a reflector wall arranged such that light travelling parallel to the length axis which is incident on the reflector wall is reflected into the appendage waveguide.

The optical structure according to the invention removes the light which is reimaged at the shoulders of the multimode interference section without significantly changing the shape of the multimode interference section until after the primary image plane.

Preferably the reflector wall is planar.

Preferably the normal to the reflector wall is at an angle to the length axis such that light travelling parallel to the length axis is totally internally reflected by the reflector wall.

Preferably the normal to the reflector wall is at an angle of between 35 degrees to 75 degrees to the length axis, more preferably 35 degrees to 65 degrees to the length axis, more preferably 40 degrees to 50 degrees.

Preferably the appendage waveguide extends normal to the length axis.

Preferably the optical structure comprises a plurality of external reflector appendages.

Preferably for at least one of the input face and output face external reflector appendages extend from both shoulder portions.

Preferably for both external reflector appendages the appendage waveguides also extend integrally from the side walls adjacent to the shoulder portions.

Preferably the optical structure further comprises a plurality of either input or output optical waveguides arranged between the shoulder portions, the waveguide structure further comprising a diverting cone arranged between the optical waveguides, the face of the cone being angled such that light travelling parallel to the length axis is reflected by the face of the cone into the appendage waveguides.

Preferably for at least one of the input face and output face an external reflector appendage extends from one shoulder portion, with the appendage waveguide also extending integrally from the side wall adjacent to the shoulder portion.

Preferably the other shoulder portion is a planar reflecting wall, the normal to the reflecting wall being inclined to the length axis such that light travelling parallel to the length axis is reflected by the planar reflecting wall into the appendage waveguide.

Preferably a single input optical waveguide is connected to the input face.

Preferably the input optical waveguide is inclined to the length axis.

Preferably the input optical waveguide is arranged closer to one side wall then the other.

Preferably the optical structure further comprises an odd mode filter connected to the input optical waveguide.

Preferably the optical structure further comprises a photodetector connected to the appendage waveguide.

Preferably the optical structure comprises a single input optical waveguide and a single output optical waveguide.

Preferably the optical structure comprises two optical input waveguides and a single optical output waveguide.

BRIEF DESCRIPTION OF THE DRAWINGS

The present invention will now be described by way of example only and not in any limitative sense with reference to the accompanying drawings in which.

DETAILED DESCRIPTION

Figure 1A:
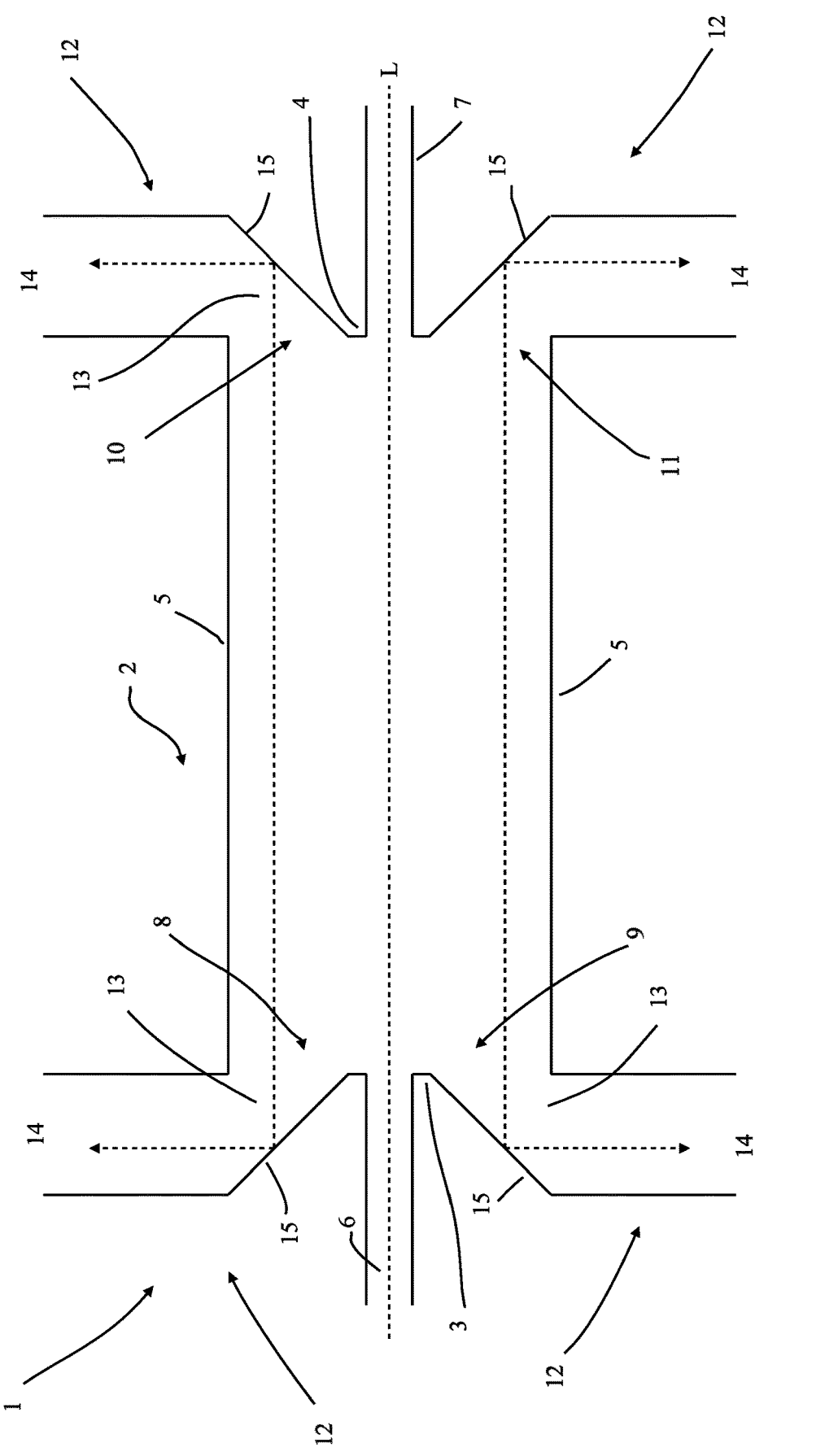
FIG. 1(a) shows, in plan view, an optical structure according to the invention.

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

Those having ordinary skill in the art will recognize that terms such as "above," "below," "upward," "downward," "top," "bottom," etc., are used descriptively for the figures, and do not represent limitations on the scope of the disclosure, as defined by the appended claims. Referring to the drawings wherein like reference numbers represent like components throughout the several figures, the elements shown in FIGS. 1(a)-4 are not necessarily to scale or proportion. Accordingly, the particular dimensions and applications provided in the drawings presented herein are not to be considered limiting.

Shown in FIG. 1(a), in plan view, is an optical structure 1 according to the invention. The optical structure 1 comprises a multimode interference waveguide (MMI) section 2. Multimode interference waveguide sections 2 are well known in the art and accordingly are not described in detail. The multimode interference waveguide section 2 comprises an input face 3, an output face 4 and sidewalls 5 extending therebetween. The sidewalls 5 extend substantially parallel to a length axis L. The optical structure 1 further comprises an input optical waveguide 6 abutted to the input face 3 spaced apart from the sidewalls 5 and an output optical waveguide 7 abutted to the output face 4 spaced apart from the sidewalls 5.

The input face 3 is divided into first and second shoulder portions 8,9 on opposite sides of the input optical waveguide 6. Similarly, the output face 4 is divided into first and second shoulder portions 10,11 on opposite sides of the output optical waveguide 7.

Integrally extending from each shoulder portion 8,9,10,11 is an external reflector appendage 12. Each external reflector appendage 12 comprises a reflector portion 13 integrally extending from the shoulder portion 8,9,10,11 and an appendage waveguide 14 integrally extending from the reflector portion 13. The appendage waveguide 14 extends along an axis which is inclined to (in this case normal to) the length axis L. The reflector portion 13 comprises a reflector wall 15. The reflector wall 15 is arranged such that light travelling parallel to the length axis L which is incident on the reflector wall 15 is reflected into the appendage waveguide 14 as shown. Light travelling close to parallel to the length axis L may also be reflected into the appendage waveguide 14.

Typically, the normal to the reflector wall 15 is at an angle to the length axis L such that light travelling parallel to the length axis L is totally internally reflected by the reflector wall 15. The exact range of angles between the length axis L and the normal to the reflector wall 15 for which total internal reflection is possible depends on the refractive index of the material of the reflector portion 13. Typically, the normal to the reflector wall is at an angle of between 35 degrees to 75 degrees to the length axis L, more preferably degrees to 65 degrees to the length axis L, more preferably 40 degrees to 50 degrees.

Figure 1B:
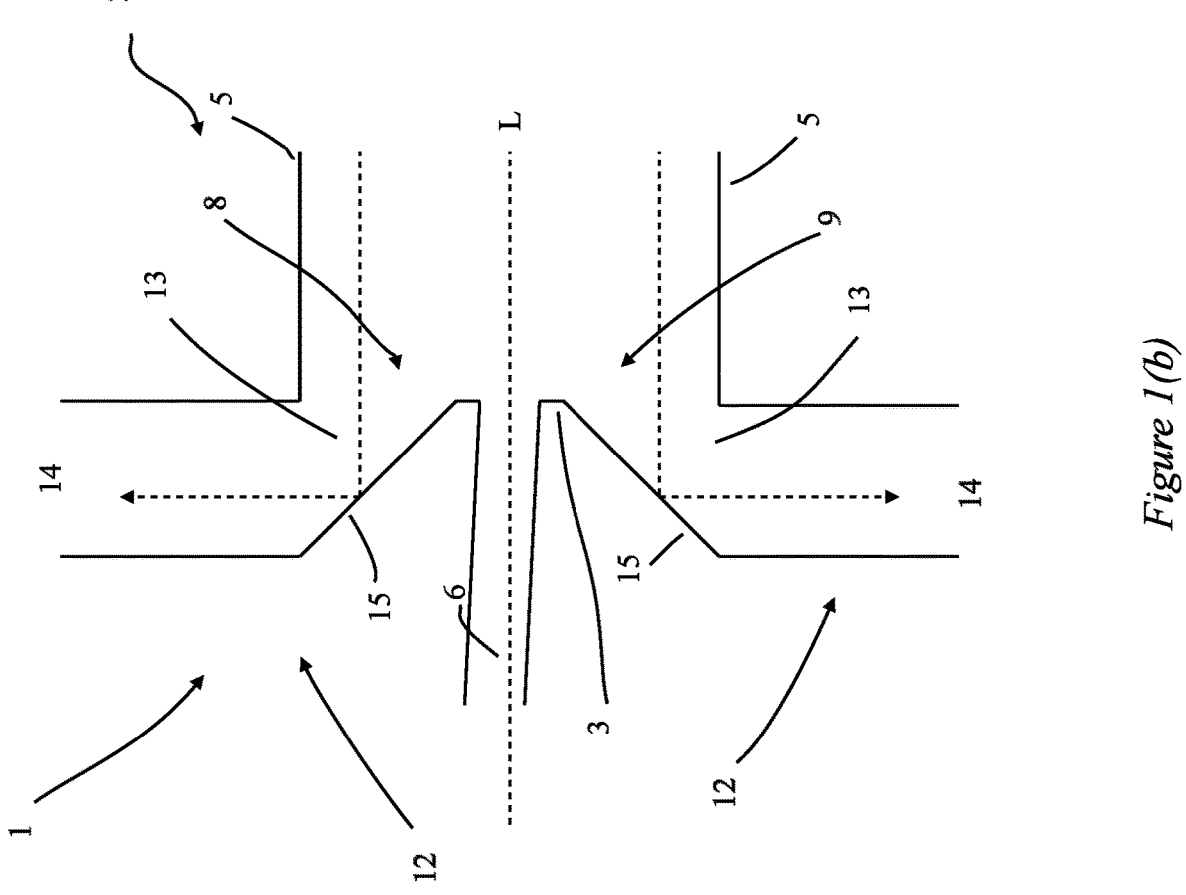
FIGS. 1(b) and 1(c) show the input face for embodiments of an optical structure according to the invention which are variants of the optical structure of FIG. 1(a)
Figure 1C:
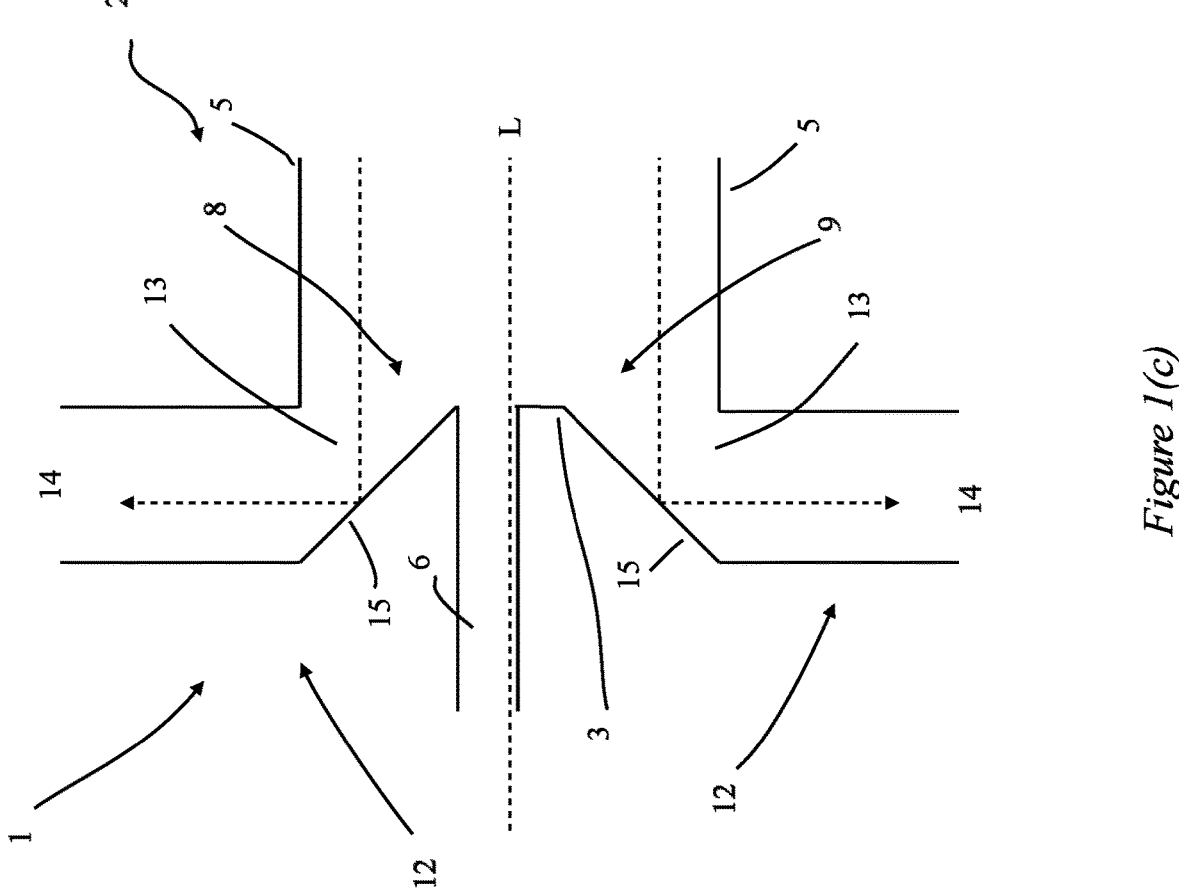

The optical structure 1 of the embodiment of FIG. 1(*a*) acts as an improved odd mode filter compared to known 1 to 1 multimode interference sections. As is known, for a 1 to 1 multimode interference section even order modes are re-imaged at the output waveguide. Odd order modes are imaged onto the shoulder portions. With a known 1 to 1 multimode interference section these odd order modes are reflected back towards the input optical waveguide. This can create internal resonances which might lead to wavelength dependent behaviour. The optical structure 1 of the embodiment of FIG. 1 removes these odd order modes into the appendage waveguides 14. This reduces or eliminates these internal resonances. It also improves the optical return loss. In the embodiment of FIG. 1 external reflector appendages 12 are included at both ends of the multimode interference section 2. This improves the suppression of resonances caused by bidirectional passage of light through the optical structure 1.

The optical structure 1 of FIG. 1(*a*) has a mirror symmetry about the length axis L. The input optical waveguide 6 is centrally aligned with respect to the MMI section 2. In consequence, only even order MMI modes are excited by even modes (including the fundamental) of the input optical waveguide 6. Similarly, only odd order MMI modes are excited by odd order input modes.

If asymmetry is introduced into the alignment of the input optical waveguide 6 with respect to the MMI section 2 then even/odd mode cross coupling will occur. In an embodiment of an optical structure which is according to the invention and which is a variant of the embodiment of FIG. 1(*a*) the input optical waveguide 6 is inclined slightly to the length axis L so introducing such asymmetry. This is shown in FIG. 1(*b*). In a further embodiment of an optical structure which is according to the invention and which is a variant of the embodiment of FIG. 1(*a*), the input optical waveguide 6 is offset slightly from the length axis L slightly (or in other words is slightly closer to one side wall 5 than the other). This is shown in FIG. 1(*c*). In either alternative this slight asymmetry in the arrangement of the input optical waveguide 6 couples optical power from the fundamental mode of the input optical waveguide 6 to the odd order modes of the MMI section 2. Mode interference within the MMI section 2 segregates the odd mode power to the shoulders 8,9,10,11 as before. By coupling a photodetector to one or more of the appendage waveguides 14 the power passing through the multimode interference section 2 can be sampled and monitored. The proportion of light power diverted to the monitor path is determined by the degree of launch asymmetry. Unlike alternative known power tap techniques this is low level so does not take much power from the main optical path. It is not disruptive to the main function as odd modes generated are all diverted to the monitor path. Unlike known alternatives such as the directional coupler, it is controllable and tolerant to optical wavelength, temperature and dimensional variation.

As with the optical structure 1 of FIG. 1(*a*), all odd mode input is diverted to the appendage waveguide(s) 14. Accordingly, a complete power tap solution will preferably include a mode filter connected to the input optical waveguide to purge uncontrolled odd modes, primarily first order modes, ensuring that the sampled light is the desired fraction of the dominant fundamental mode. The mode filter could, for example, be the optical structure of FIG. 1(*a*).

Figure 2:
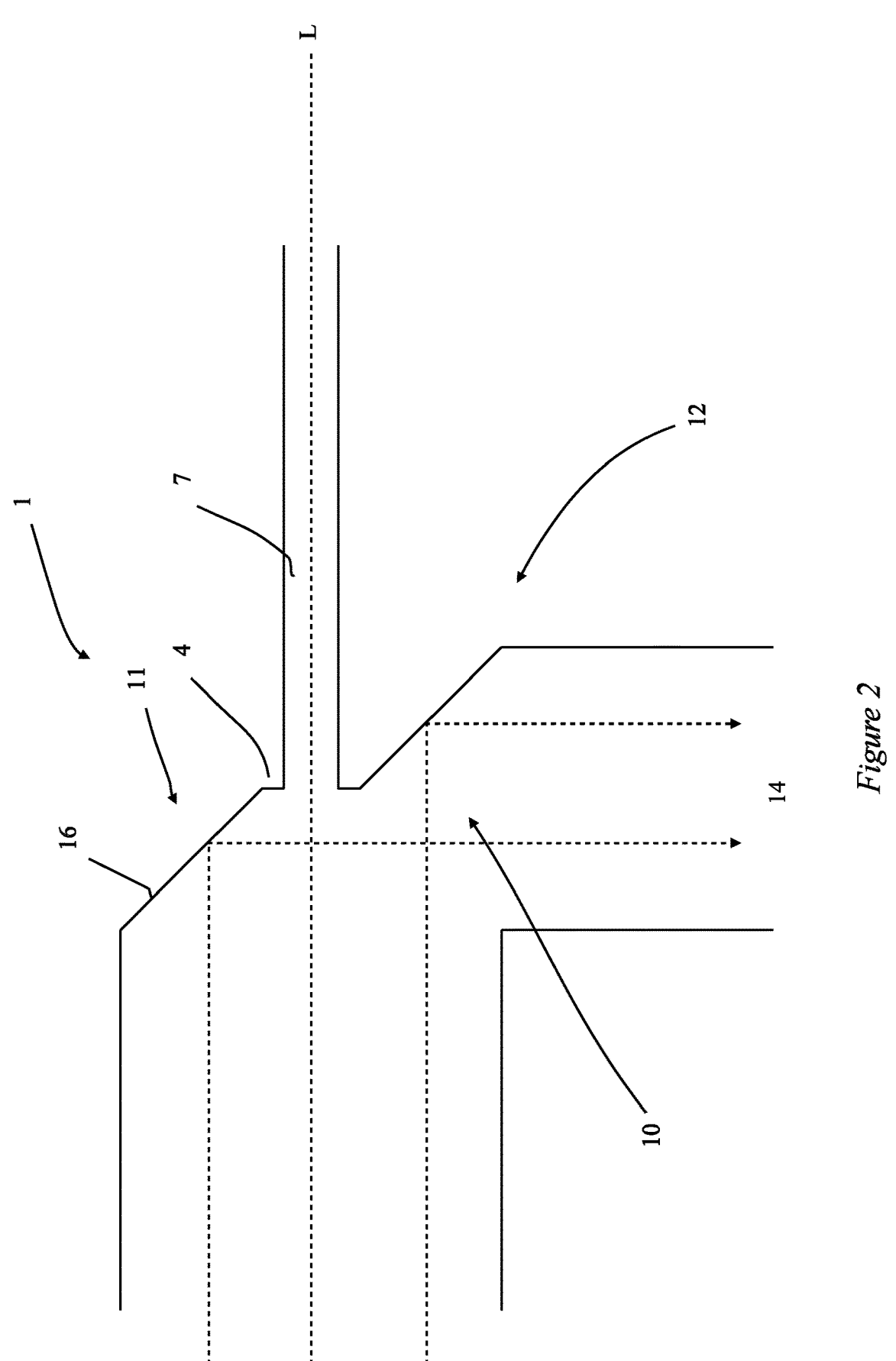
FIG. 2 shows, in plan view, a portion of a further embodiment of an optical structure according to the invention.

Shown in FIG. 2 is a portion of a further embodiment of an optical structure 1 according to the invention. Integrally extending from the first shoulder portion 10 is an external reflector appendage 12 as before. In this embodiment the appendage waveguide 14 extends integrally not only from the reflector portion 13 but also from the side wall 5 adjacent to the shoulder portion 10.

In this embodiment the other shoulder portion 11 comprises a secondary planar reflecting wall 16. The normal to the secondary planar reflecting wall 16 is inclined to the length axis L as shown. In use light which travels along the length axis L and is incident on the secondary reflecting wall 16 is reflected into the appendage waveguide 14 as shown. The structure of the embodiment of FIG. 2 combines signals from both shoulders 10,11 into a single appendage waveguide 14. This increases efficiency however the secondary reflecting wall 16 cuts off a corner from the multimode interference waveguide section 2 while a similar length of sidewall 5 is removed from the other side prior to the image plane at 4. This will reduce performance slightly. The appendage waveguide 14 is wide and multimoded in order to efficiently capture and retain the two contributions from the reflectors 15,16 where relative phase is indeterminate owing to the different optical paths traversed. This multimode lightpipe behaviour of waveguide 14 is acceptable in combination with a large area photodetector for power monitoring applications.

Figure 3:
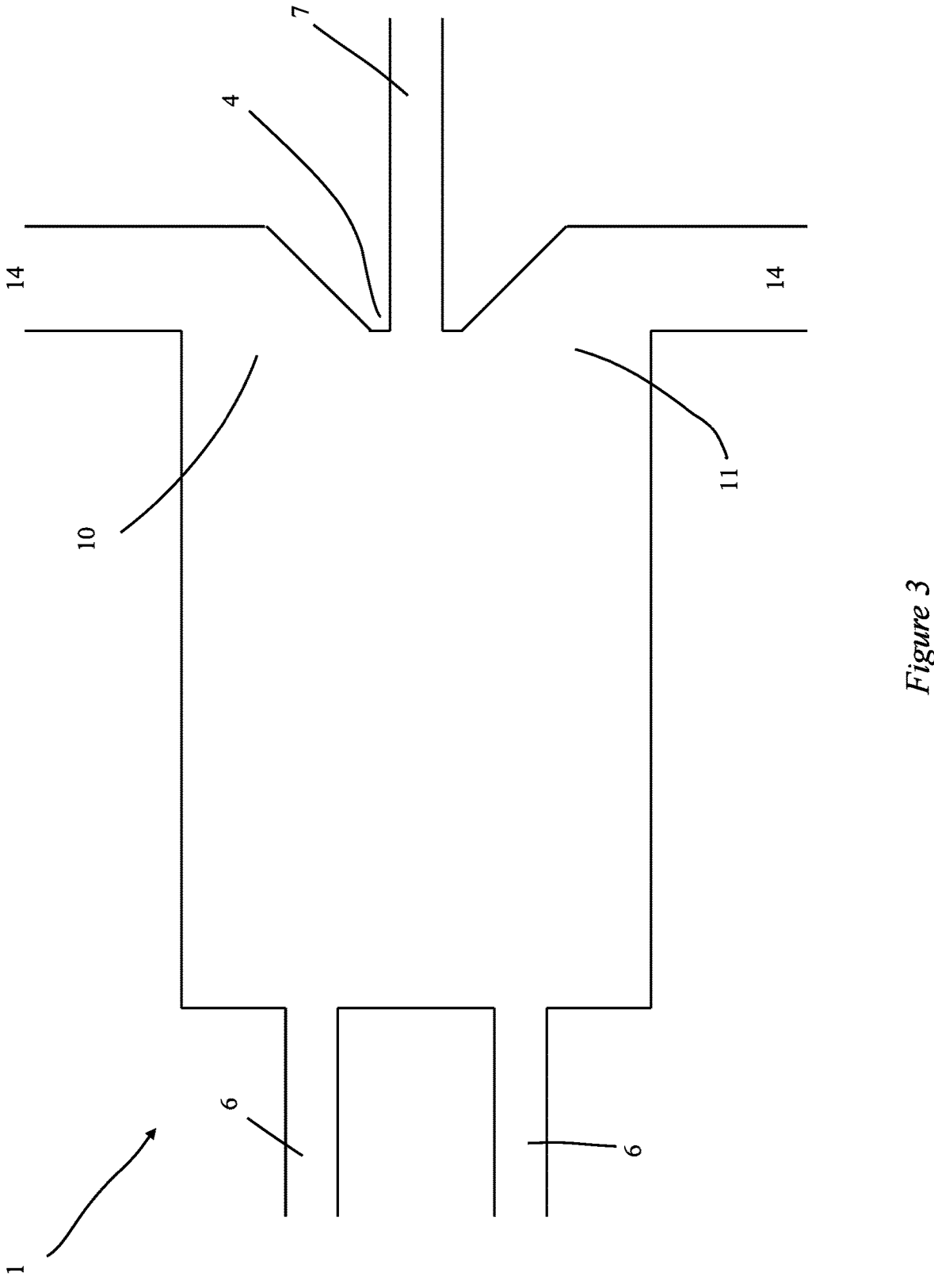
FIG. 3 shows, in plan view, a further embodiment of an optical structure according to the invention; and, FIG. 4 shows, in plan view, a portion of a further embodiment of an optical structure according to the invention

Shown in FIG. 3 is a further embodiment of an optical structure 1 according to the invention. This embodiment comprises two input optical waveguides 6 and a single output optical waveguide 7. This is a configuration commonly found for optical recombination in a Mach Zehnder interferometer modulator. When in phase signals are provided to the two input optical waveguides 6 they combine at the output optical waveguide 7. When anti-phase inputs are provided to the input optical waveguides 6 all the light is routed to the shoulders 10,11 of the output face 4. This light is reflected into the appendage waveguides 14. The light can be dumped into an absorber or alternatively, the light can be received by a photodetector which is used to monitor the state of the inputs to the input optical waveguides 6. The light intensity received by the photodetector varies as a squared sine function of the phase differential. This is complementary to the main output rather than directly representative thereof. The multimode interference section of this embodiment is dimensioned for 2 to 1 recombination (or alternatively 1 to 2 splitting) whilst the embodiment of FIG. 1(*a*) is double this length and dimensioned for 1 to 1 re-imaging.

Figure 4:
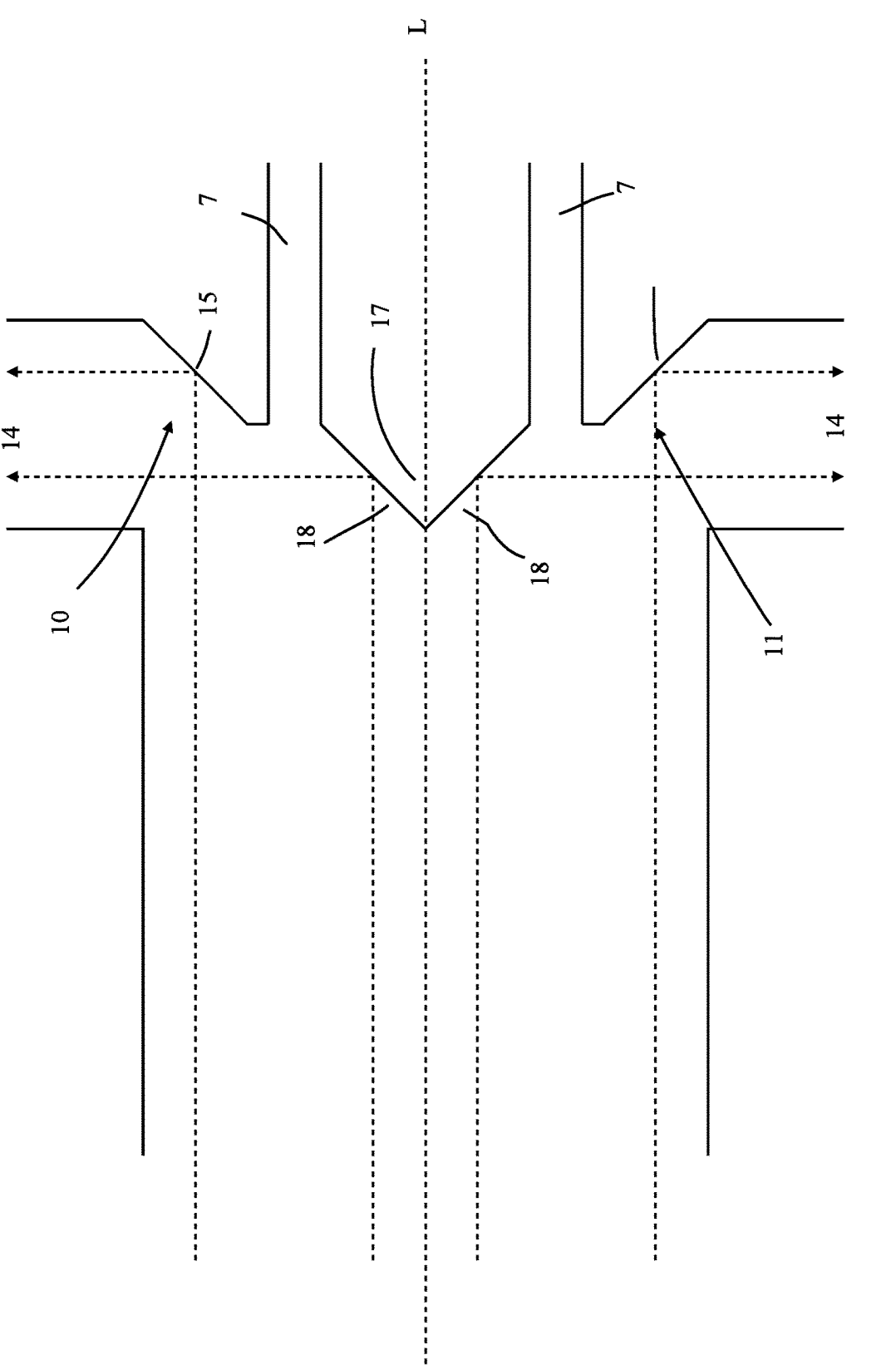

Shown in FIG. 4 is a portion of a further embodiment of an optical structure 1 according to the invention. In this embodiment there are two output optical waveguides 7 connected to the output face 4. Arranged between the two output optical waveguides 7 is a diverting cone 17 having an angled face 18. Integrally extending from both shoulders 10,11 are external reflector appendages 12 The appendage waveguides 14 of the two external reflector appendages 12 also extend integrally from side walls 5 adjacent to the shoulder portions 10,11. This embodiment has application as a 1 to 2 splitter and is essentially the embodiment of FIG. 3 in reverse. The reflector appendages of the embodiment of FIG. 4 can be applied to the input face of the embodiment of FIG. 3 to improve performance in the event of bi-directional light propagation.

The face 18 of the diverting cone 17 is angled such that light which travels parallel to the length axis L and is incident on the angled surface 18 is reflected, typically by total internal reflection, into the appendage waveguides 14. Similarly, light travelling parallel to the length axis L which is incident on the reflector walls 15 of the two external reflector appendages 12 is also reflected into the appendage waveguides 14 as shown.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of 'comprising' and "including" to provide more specific embodiments and are also disclosed. As used in this disclosure and in the appended claims, the singular forms "a", "an", "the", include plural referents unless the context clearly dictates otherwise.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An optical structure comprising:
a 1 to 1 multimode interference waveguide section, the multimode interference waveguide section comprising an input face, an output face and sidewalls extending therebetween, the sidewalls extending substantially parallel to a length axis;
a single input optical waveguide abutting the input face and spaced apart from the sidewalls; the single input optical waveguide being at least one of inclined to the length axis and arranged closer to one sidewall than the other;

a single output optical waveguide abutting the output face and spaced apart from the sidewalls;
the input face being divided into first and second input face shoulder portions arranged on opposite sides of the input optical waveguide; and
the output face being divided into first and second output face shoulder portions arranged on opposite sides of the output optical waveguide;
the optical structure further comprising at least one external reflector appendage, the at least one external reflector appendage comprising a reflector portion integrally extending from a shoulder portion and an appendage waveguide integrally extending from the reflector portion along an axis inclined to the length axis, the reflector portion comprising a reflector wall arranged such that light travelling parallel to the length axis which is incident on the reflector wall is reflected into the appendage waveguide.

2. The optical structure as claimed in claim 1, wherein the reflector wall is planar.

3. The optical structure as claimed in claim 2, wherein a normal to the reflector wall is at an angle to the length axis such that light travelling parallel to the length axis is totally internally reflected by the reflector wall.

4. The optical structure as claimed in claim 2, wherein the normal to the reflector wall is at an angle of between 35 degrees to 75 degrees to the length axis.

5. The optical structure as claimed in claim 1, wherein the appendage waveguide extends normal to the length axis.

6. The optical structure as claimed in claim 1, comprising a plurality of external reflector appendages.

7. The optical structure as claimed in claim 6, wherein for at least one of the input face and output face external reflector appendages extend from both shoulder portions.

8. The optical structure as claimed in claim 7, wherein for both external reflector appendages the appendage waveguides also extend integrally from the side walls adjacent to the shoulder portions.

9. The optical structure as claimed in claim 1, wherein for at least one of the input face and output face an external reflector appendage extends from one shoulder portion, with the appendage waveguide also extending integrally from the side wall adjacent to the shoulder portion.

10. The optical structure as claimed in claim 9 wherein the other shoulder portion is a planar reflecting wall, the normal to the reflecting wall being inclined to the length axis such that light travelling parallel to the length axis is reflected by the planar reflecting wall into the appendage waveguide.

11. The optical structure as claimed in claim 1 further comprising an odd mode filter connected to the input optical waveguide.

12. The optical structure as claimed in claim 1, further comprising a photodetector connected to the appendage waveguide.

* * * * *